Dec. 22, 1936.  L. L. SCHAUER  2,065,476
SIMPLIFIED CONTROL FOR DRILL SPINDLES
Filed Jan. 22, 1935  4 Sheets-Sheet 2
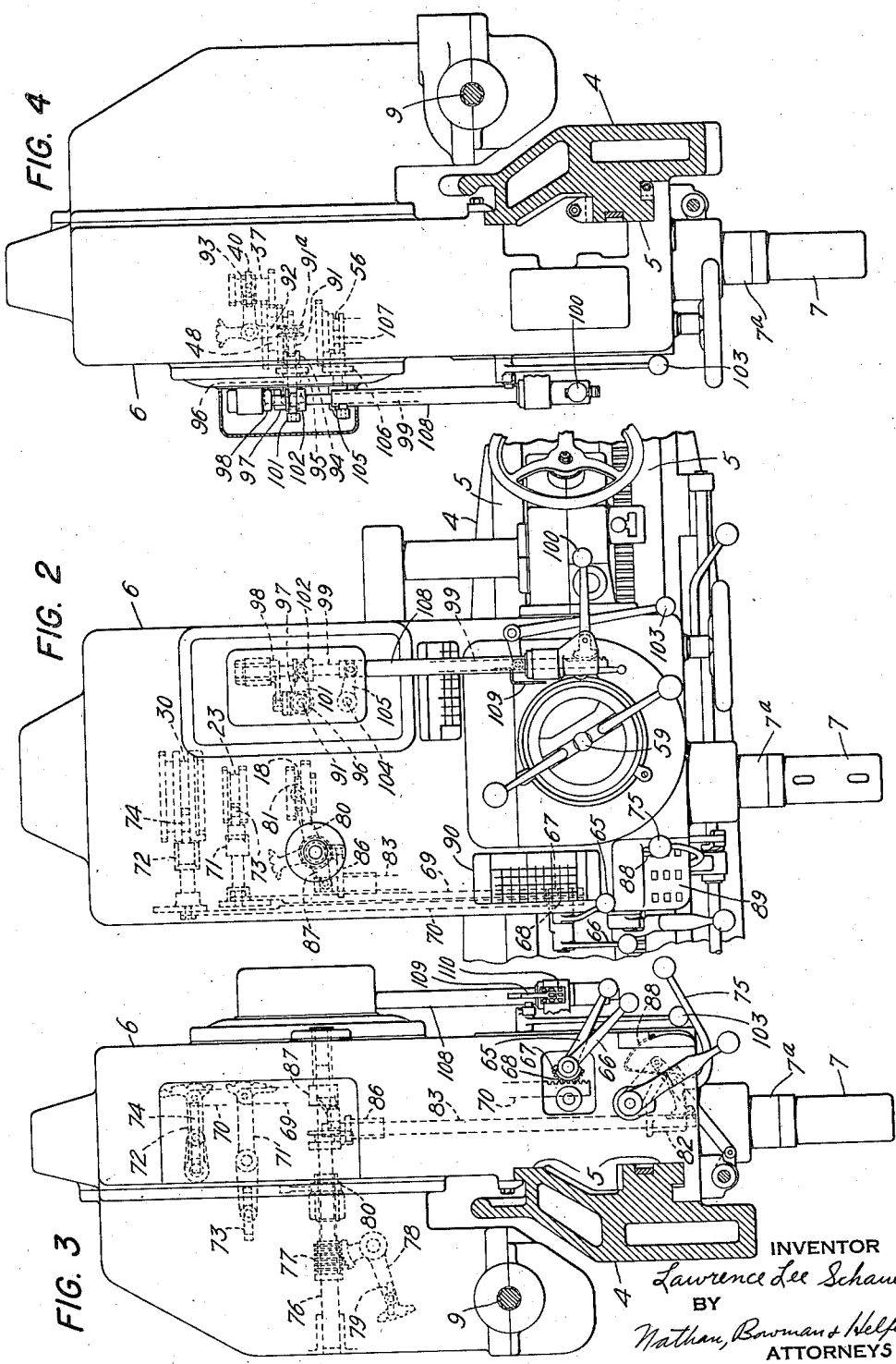
INVENTOR
Lawrence Lee Schauer
BY
Nathan, Bowman & Helfrich
ATTORNEYS Dec. 22, 1936.      L. L. SCHAUER      2,065,476
SIMPLIFIED CONTROL FOR DRILL SPINDLES
Filed Jan. 22, 1935      4 Sheets-Sheet 3
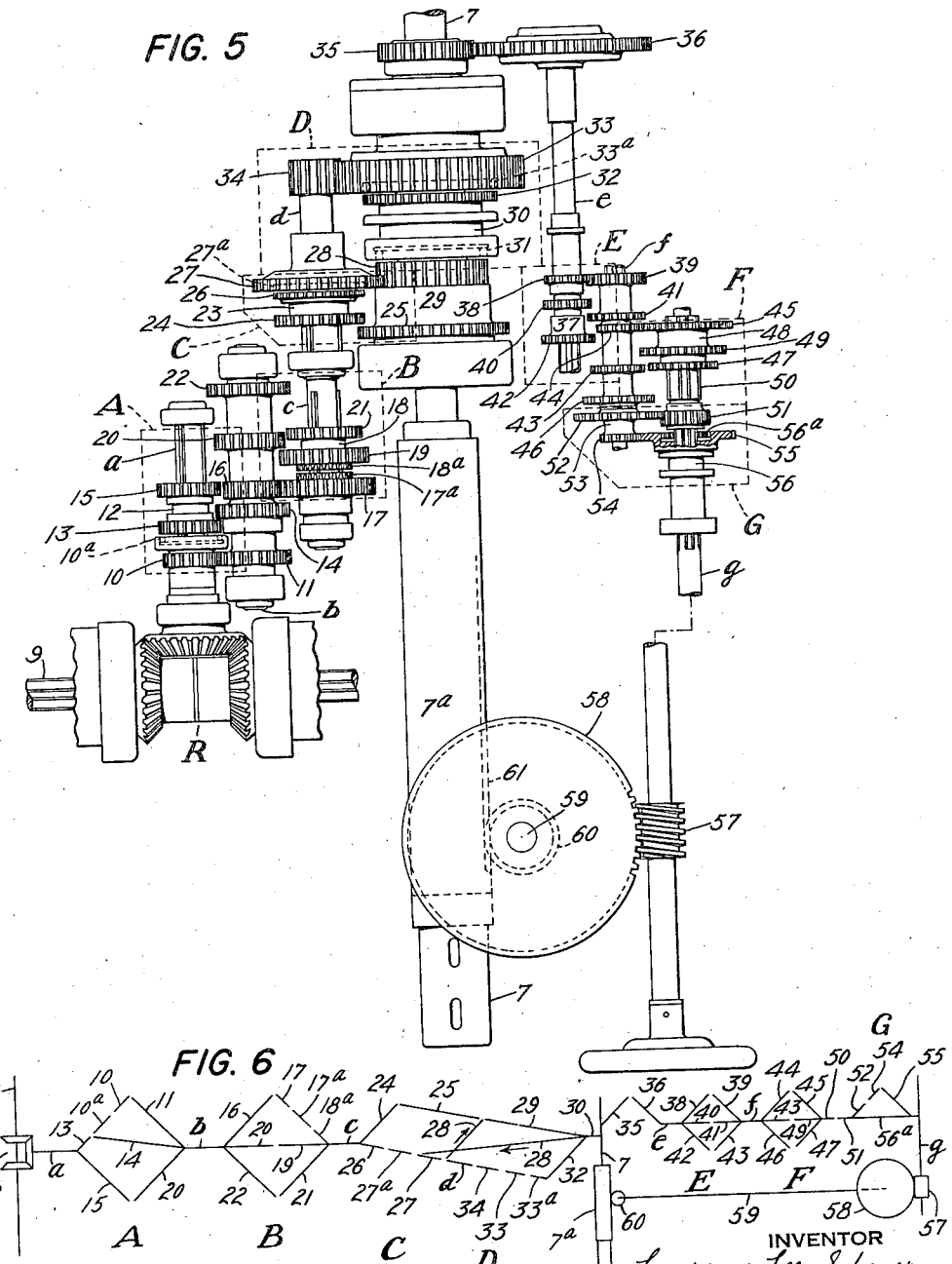
INVENTOR
Lawrence Lee Schauer
BY
Nathan, Bowman + Helferich
ATTORNEYS Dec. 22, 1936.  L. L. SCHAUER  2,065,476
SIMPLIFIED CONTROL FOR DRILL SPINDLES
Filed Jan. 22, 1935   4 Sheets-Sheet 4
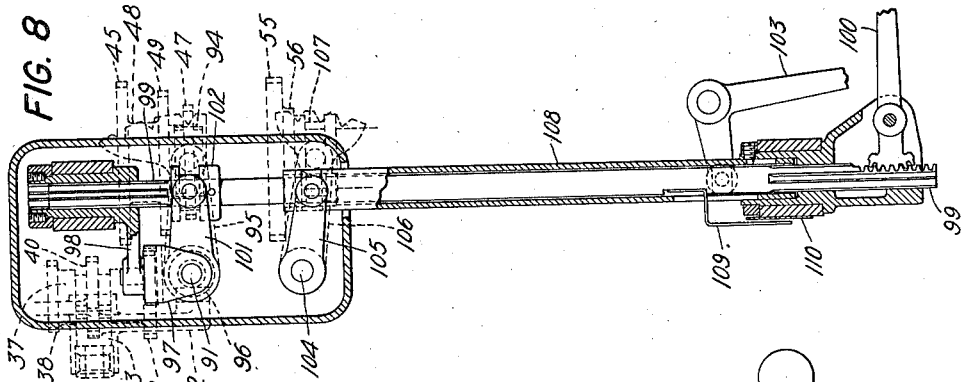
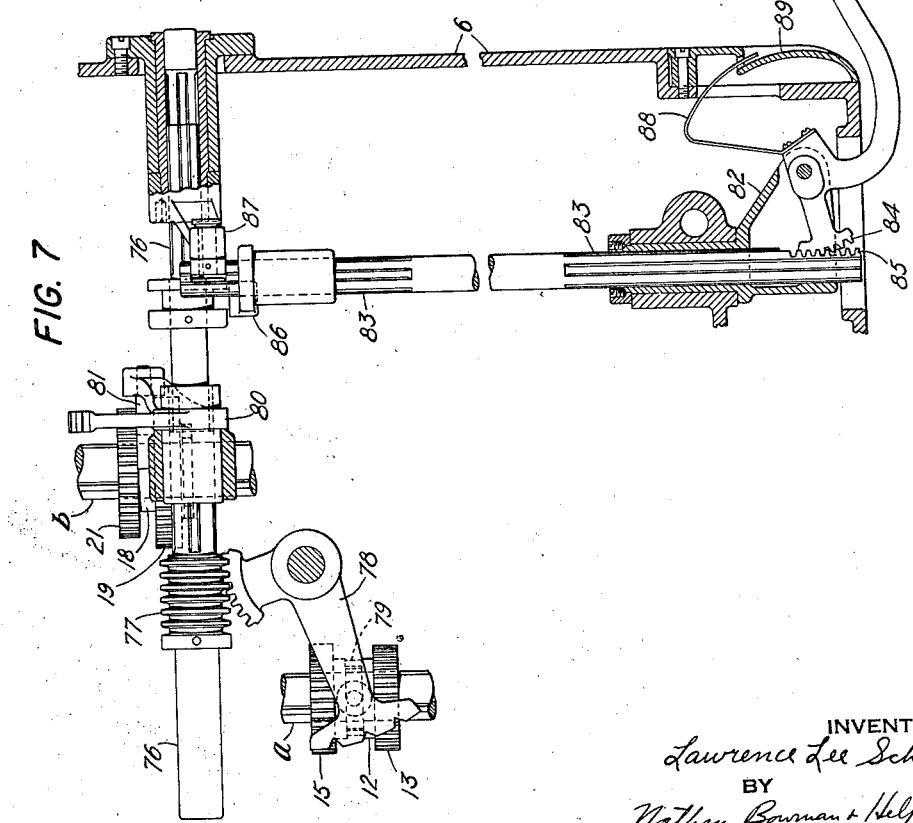
INVENTOR
Lawrence Lee Schauer
BY
Nathan, Bowman & Helfrich
ATTORNEYS Patented Dec. 22, 1936

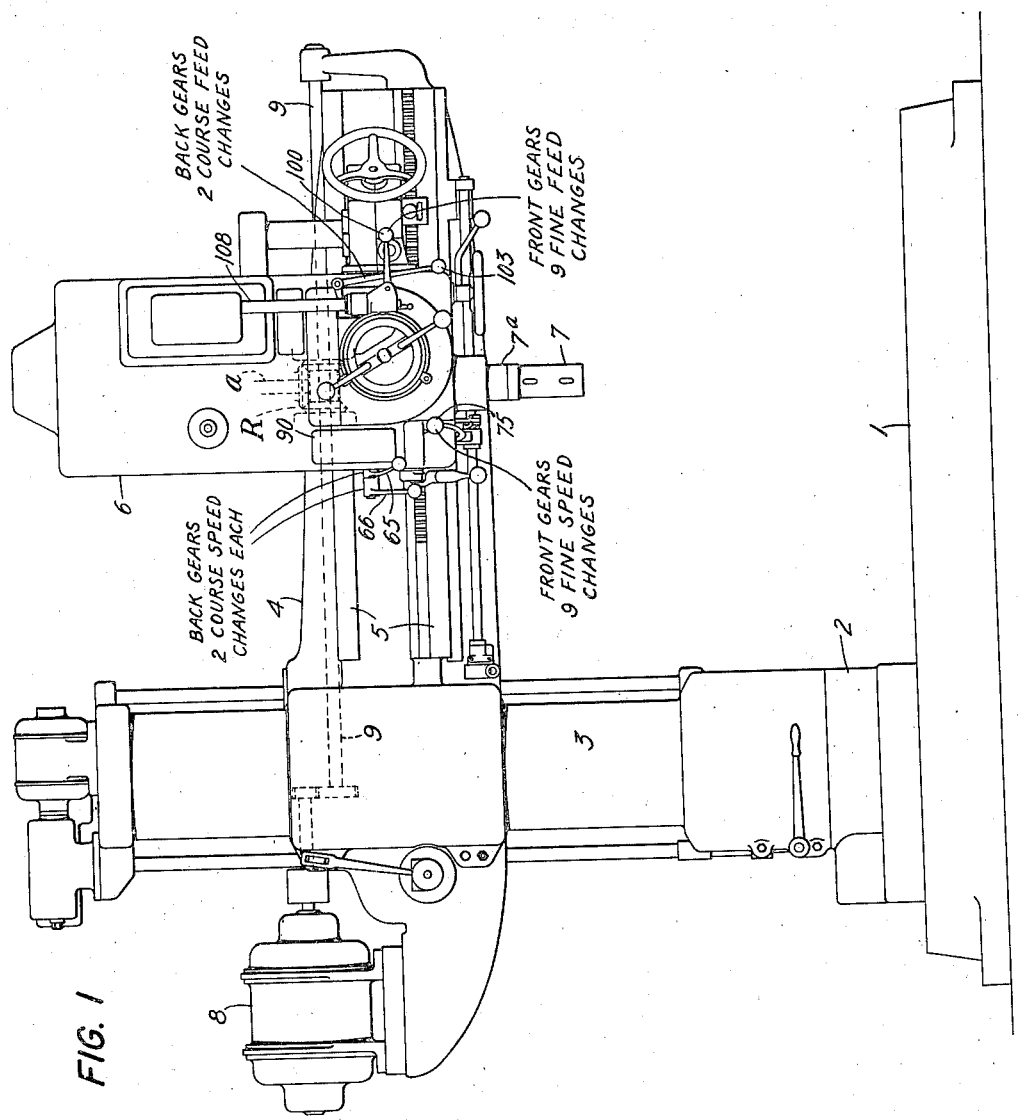

2,065,476

UNITED STATES PATENT OFFICE 2,065,476

SIMPLIFIED CONTROL FOR DRILL SPINDLES

Lawrence Lee Schauer, Wyoming, Ohio, assignor to The Cincinnati Bickford Tool Company, Oakley, Cincinnati, Ohio, a corporation of Ohio Application January 22, 1935, Serial No. 2,866

9 Claims. (Cl. 77—28)

This invention relates to radial drilling machines and particularly to improvements in the spindle control means thereof whereby such machines may be rendered more safe and more quickly and easily controlled from the operator's normal working position.

Heretofore it has been customary in the design of machines of this character, to locate the various control levers immediately adjacent the mechanisms controlled thereby. Frequently, developments of that kind, although prompted by certain engineering rules, resulted in a machine in which many of the controlling devices were located out of reach of the operator. In consequence, the operator, in order to set up the machine for a new workpiece or to effect some change in the operation, was forced to resort to boxes, stepladders, etc. to enable him to secure a proper purchase upon the control medium. That method of controlling a machine, introduced a hazardous condition for the reason that standing platforms or ladders were not always available and, in their absence, an operator would find other ways of making the change, such as, for example by climbing upon the workpiece or machine, or by actuating the control device by a bar or a stick if one was available. Accordingly, a primary aim of this invention is to eliminate any need for effecting changes in machine tool cycles by methods such as above given. This object has been accomplished in this invention by providing a system of mechanical linkages and levers so arranged that the operating control lever is located in a position where it can be reached and actuated by an operator from his normal position on the floor in front of the machine. Also, in prior machines many of the control levers frequently used by an operator in the course of the tooling operation were located in such positions that the operator was obliged to move away from his normal position in order to make the required changes in the machine cycle. In so doing he neglected the work for an appreciable interval of time and was unable, in many cases, to observe the effect of the change until after the change in cycle had been initiated. The present invention has for a further aim to eliminate that reason or cause for neglect and to render a machine capable of being fully controlled by an operator at and from his normal work station where he may at once see and observe the effect of the changes made and instantaneously correct them, if necessary.

The present invention is peculiarly adapted to radial drills, for in that type of machine, the tool head, in which is journaled the drill spindle and in some machines all the change speed gearing therefor, is translatably mounted upon a horizontally disposed arm. To accommodate the machine to a large variety of work, the arm member is adapted to be moved vertically upon an upstanding column. In machines of this character having the spindle controls mounted upon the head, the arm is frequently in an elevated position. The drill head proper is often, therefore, in an elevated position and many of the controls thereon are clearly out of reach. To actuate the controls an operator must take his attention from the work, resort to a hurriedly improvised stand, make the changes required and then return to his original position to see if the proper changes were made.

A further object of this invention is to so locate the spindle control levers on the drill head of a radial drilling machine that irrespective of the position of the radial drill arm upon the vertical column, the control levers are within the reach of the operator for quick and easy actuation.

In a radial drill, for example, a great many different spindle speeds and feeds must be available for instant use. And in the present machine all the speed change gearing is mounted in the head and as many as 36 different speeds and 18 different feeds are selectively available. To avoid the use of too many control levers for such a range of speeds and feeds, the gear shifting mechanisms are designed so that one lever may have two or more effective positions in each of two or more different planes. The respective gear trains for producing the necessary speed and feed changes are made up of a plurality of change gear sets arranged in series. Each change gear set has associated therewith a control lever, and, as the various sets are located in different regions of the tool head, the control levers therefor would normally be located at different positions on the head. It is one of the aims of the present invention, however, to centralize all of the control levers in such manner that an operator may readily make any change in speed or in feed without detracting his attention from the work being performed by the spindle.

In accomplishing that end it is proposed to provide a distant control means for the several high located change speed transmissions, so arranged that the movements of several control levers correspond and reproduce at the change gear mechanisms the requisite movement of the gears to obtain any given speed or feed. Thus, if the clutch or gear shifting lever shaft partakes of several movements in different planes the distant control is arranged so that similar movements imparted to the ultimate control lever reproduces those same movements to the clutch or gear shifting levers. Thus, it will be seen that the present invention contemplates a rearrangement of speed and feed control whereby remotely located gears of change speed mechanisms may be shifted from the operator's normal work station.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 represents a radial drilling machine embodying the present invention, the legends thereon indicating the functions of the respective control levers illustrated.

Fig. 2 is an enlarged view of the tool head illustrating speed and feed control levers and certain gear units controlled thereby.

Fig. 3 is an enlarged view of a portion of the machine illustrating a preferred form of distant control whereby a single lever may move a remotely located transverse control shaft to any one of three different positions in any one of three different planes in obtaining one of nine different spindle speeds.

Fig. 4 is an enlarged view illustrating a preferred form of distant control whereby two levers combinedly impart to two remotely located transverse control shafts the requisite movements to enable the operator to select any one of 18 different spindle feeds.

Fig. 5 is a development in diagrammatic form of the change speed gearing mounted in the tool head, and Fig. 6 is a line diagram of the same gearing.

Figs. 7 and 8 are enlarged views of portions of the spindle speed and feed control devices.

Referring more particularly to Fig. 1 of the drawings, the machine disclosed therein represents a conventional drilling machine of the radial type. Machines of this character are generally provided with a base member 1, having an upright column 2 at one end thereof, upon which is rotatably mounted a sleeve 3. A radial arm 4, mounted upon the sleeve and adapted for vertical movement thereon, is provided with guideways 5 upon which a tool head 6 is translatably supported.

In this type of machine power for driving the spindle 7 and for elevating the arm 4 is derived from a motor 8 also carried by the arm. An arm shaft 9 transmits the motive power to the head 6, through the medium of a reversing mechanism R carried by the head at the rear thereof. Suitable change gears, hereinafter referred to, are journaled in the head and provide, in the present construction, 36 spindle speeds and 18 different feeds. The spindle drive train is composed of four sets of speed change mechanisms, A, B, C and D, serially arranged, and the spindle feed train is composed of three sets of speed change mechanisms, E, F and G, likewise serially arranged.

Referring more particularly to Figs. 5 and 6, it will be observed that power from the arm shaft 9 may be transmitted to the spindle 7 in reverse directions through the reverser mechanism R. From the reverser, power enters the tool head through the shaft $a$ whence it may be transmitted to the shaft $b$ at any one of three speeds provided by the first change speed set A. In this change speed set the clutch gear 10 is loose on the shaft $a$ and is in mesh with the gear 11 keyed to shaft $b$; the shiftable cluster gear 12 is splined to shaft $a$ and is adapted to be shifted thereon so as to clutch the gear 13 thereof with the teeth $10^a$ of gear 10, or to mesh the teeth of gear 13 with the gear 14, or to mesh the teeth of gear 15 with the gear 20 on shaft $b$. Power imparted to the shaft $b$ is transmitted to the shaft $c$ by means of a second set of change speed gearing B. This set comprises a loose running clutch gear 17 which is constantly in mesh with the gear 16; a splined cluster gear clutch element 18 which is provided with clutch teeth $18^a$ adapted to mesh with clutch teeth $17^a$ whereby the gear 17 may be selectively keyed to the shaft $c$. The cluster element 18 is also provided with gears 19 and 21 adapted selectively to mesh with gears 20 and 22 respectively that are keyed to the shaft $b$. Thus the three speeds of the set A are multiplied by the three speeds of the set B, giving nine speeds to the shaft $c$. These nine speed changes, frequently referred to as the "front" gear speed changes, preferably effects the finer changes in spindle speeds and are located at the input end of the train.

The coarse changes in speed are effected by the "back gear" speed change sets C and D adjacent the spindle. The set C comprises a clutch gear 23 splined to the shaft $c$ and which is provided with gears 24 and 26 adapted respectively for selective meshing with a gear 25 loose upon the spindle shaft 7, or with the clutch teeth $27^a$ of the gear 27. The gear 27 is keyed to a separate shaft $d$, and in turn meshes with the teeth 28 of the loose running unit 29. Thus, when the clutch element 23 is "down", gears 24 and 25 are engaged; when the element is "up" gears 27 and 28 are driven, whereby the nine speeds are multiplied by two to the gear unit 29.

The gear unit 29 may or may not be locked to the spindle shaft 7 depending upon the position of the sliding clutch element 30 of the change speed set D. This clutch element is provided with clutch teeth 31 and 32, adapted respectively selectively to engage teeth 28 or $33^a$ of the loose running gear 33. The gear 33 is constantly in mesh with the gear 34 keyed to the short shaft $d$. The two change speed sets C and D together provide four coarse changes in speeds, giving a total of 36 selectively available speeds to the spindle with the use of but four shiftable elements 12, 18, 23 and 30.

With clutch elements 30 and 23 both "down" the nine speeds of shaft $c$ are transmitted to the spindle through the elements 24—25, 29 and 30; with gear unit 30 "down" and 23 "up", power is transmitted through elements 26—27, 29 and 30; with gear units 30 "up" and 23 "down" the drive is through elements 24—25, 29, 28—27, $d$, 34—33, $33^a$, 32 and 30; with both clutch elements 30 and 23 "up" the drive from shaft $c$ is through 26—27, $d$, 34, 33, $33^a$—32 and 30.

The drive for the spindle feed train is, in this instance, taken "off the spindle" through gears 35 and 36. The gear 36 is secured to a shaft $e$ which has also splined thereto a three-gear sliding unit 37 forming part of the first set E of speed change mechanisms in the feed train. The gears 38, 40 and 42 of the sliding unit 37 are adapted to be meshed with the gears 39, 41 and 43 respectively, keyed to a shaft f. The shaft f has also keyed thereto gears 44 and 46, so positioned as to be selectively meshed by the gears 45 and 47 of a three gear sliding unit 48, which forms part of the second set F of speed change mechanisms in the feed train. The gear 49 of the sliding unit 48 is adapted to mesh with the gear 43 on the shaft f.

The gear unit 48 is splined to a loose running sleeve member 50 which is provided at its lower end with teeth 51 constantly meshing with the teeth of the gear 52 formed in the gear unit 53. The unit 53 runs loose upon the shaft f and is provided with a second gear 54 which is adapted to mesh with gear 55 on a clutch element 56 of the third set G of speed change mechanisms. When the clutch element 56 is "down" any one of the nine speeds imparted to the sleeve 50 by the change speed sets E and F may be imparted to the feed shaft g through gears 51—52, 54—55 and when the clutch element is "up" the drive is direct through element 51 and clutch teeth 56ª of the unit 56. In this manner any one of 18 different speeds may be imparted to the feed shaft g for any given spindle speed. These various speeds effect translatory movement of the spindle through the worm and worm wheel elements 57—58, pinion shaft and pinion 59—60 and rack teeth 61 formed upon the non-rotatable spindle sleeve 7ª. As in the spindle rotating train, the "front" gear sets E and F of the feed train provide nine fine changes in feed and are placed at the input end of the feed train, while the "back" gear set G, providing two coarse changes in feed, is placed at the output end of the train. This is for the purpose of reducing the sizes and weights of the majority of the shafts and gears of the drive and feed trains and for the further purpose of confining the shock incident to making coarse changes in feed or speed to element ultimately effected thereby.

However, with a speed and feed transmission providing 36 speeds and 18 feeds, space limitations prevent the location of all of the serially arranged gear sets at a low position in the head of radial drill. Certain of the gear sets must, therefore, be arranged one above the other somewhat as shown diagrammatically in Fig. 5. Heretofore, it was customary and convenient to locate the various levers that controlled the positioning of the several sliding gear units, above mentioned, closely adjacent the particular sliding gears controlled thereby. In consequence certain of the control shafts projected from the head casing at elevations much higher than others. The control levers attached thereto could not, accordingly, be reached by an operator and especially when the radial arm was positioned in the upper portion of its normal range.

This circumstance led to the hazardous conditions of control hereinbefore explained and which this invention successfully meets and overcomes. In achieving a more safely controlled and operated machine this invention proposes to simplify and to reduce the number of control levers and to place all control levers at the lowermost position on the head. As an example, in the spindle drive train shown, four shiftable units are illustrated which in various combinations produce any one of 36 speeds. The positioning of those four elements is, as will hereinafter be explained, controlled by three levers, each distantly located from the elements controlled thereby. In the feed train disclosed, three shiftable elements effect 18 different changes in feed and these elements are likewise distantly controlled by two levers.

The control of the speeds and feeds is, in the present invention, further simplified by so arranging the control mechanisms that one control lever is utilized in each train for effecting the nine finer speed changes produced by the "front" gear sets of each train, and each of the "back" gear sets in each train have separate control levers. Thus, the two "front gear" speed control levers have nine positions each, and the three "back gear" control levers have two positions each.

The manner in which the sliding gears of the several gear sets may be distantly controlled will be understood more clearly by referring to Figs. 2, 3 and 4. In Fig. 2, two levers 65 and 66 are pivoted to the lower portion of the tool head and are provided at their inner ends with gears 67 and 68 respectively. Rock-bars 69 and 70 transmit motion from the gears 67 and 68 to the gear shifting levers 71 and 72 pivotally arranged adjacent the back gear sets C and D of the spindle drive trains. The lever 71 has secured thereto a shifter fork 73 adapted to engage a groove in the clutch gear unit 23, and the lever 72 is provided with a shifter fork 74 adapted to engage a groove in the clutch element 30. Accordingly, the lever 65 controls the positioning of element 23 in the back gear set C, and lever 66 controls the positioning of element 30 of the back gear set D, each lever thereby having two effective positions. Suitable detent means are provided, preferably associated with the fork shifting levers 71 and 72, for holding the parts in their shifted positions.

The "front" gear sets A and B of the spindle drive train are controlled by a single lever 75 also located at the lowermost position on the tool head, and inasmuch as the two shiftable units 12 and 18 of those sets have three positions each, the control means must be arranged to have a total of nine distinct positions and in each position be capable of movement to two other positions without affecting the position of one of the elements 12 or 18 previously positioned. This is accomplished by a rotatable and axially movable speed change lever shaft 76 journaled in the head adjacent the gear sets A and B. The rear end of the shaft 76 has secured thereto an annular rack 77 adapted to mesh with teeth formed upon a bell-crank shifter lever 78 pivoted to the housing. The free end of the lever 78 is provided with a shifter fork 79 which tracks a groove in the gear element 12 of the gear set A. The shaft 76 has also a splined connection with a second shifter lever 80, which in turn is provided with a shifter fork 81 for actuating the element 18 in the gear set B. Thus, axial movement of the shaft 76 effects a repositioning of the sliding element of one of the "front" gear sets, and rotary movement of the shaft effects repositioning of the sliding element of the other "front" gear set, the movement of each sliding gear, however being controlled independently from the one control shaft 76.

The required movements of the control shaft are imparted thereto by the control lever 75. For this purpose the lever 75 is pivoted to a swinging bracket member 82 (shown on an enlarged scale in Fig. 7) which in turn has a splined connection with a vertically arranged shaft 83. The bracket 82 is rotatably journaled in the main housing but does not move axially therein. The inner end of the lever 75 is also provided with gear teeth 84 which mesh with teeth 85 provided on the vertical shaft 83. Thus when the lever 75 is moved in a vertical plane about its pivot, the shaft 83 is shifted axially, and when the lever 75 is moved in a horizontal plane, the shaft 83 is rotated. These axial and rotatable movements of the control shaft 83 are transferred to the lever shaft 76, by two levers 86 and 87, one lever being splined to each of the transverse shafts 76 and 83 and adapted to track a groove provided in the other shaft. Thus, the lever 86 is splined to shaft 83 and tracks a groove in shaft 76, and, accordingly, oscillation of shaft 83 reciprocates the lever shaft 76. The second lever 87 is splined to shaft 76 and tracks a groove in the shaft 83, and, therefore, axial movement of the control shaft 83 oscillates the lever shaft 76.

To enable the operator quickly to select any given speed the front gear speed control lever carries a pointer 88 which projects through an operative in the main casing and moves across the face of a dial plate 89 located at the front thereof. The dial plate represents a section of a sphere and is provided with three horizontal and vertical rows of indicia corresponding with the nine speed changes made possible by the front gear speed change sets A and B.

The back gear speed control levers 65 and 66 have, likewise, a dial plate 90 associated therewith with indicia thereon indicating corresponding positions of the back gears when the two levers are in any one of their four effective positions. The three speed control levers, as well as the dial plates being positioned at a low point upon the drill head, places all of the spindle speed controls within the reach of the operator even though the arm may be positioned at the upper portion of the column. And by such an arrangement the operator is not required to leave his position at the spindle while making the frequent changes in spindle speeds.

The distant control means described above relates to the spindle speeds, which is but half of the controls for the spindle drive. The other half of the controls for the spindle concern the feed works which include change speed gear sets E, F and G above referred to.

This train of gearing, like the spindle drive gearing, cannot be located low in the drill head without displacing the ultimate feed means for the spindle as well as the manual traverse mechanisms, head traverse mechanisms, etc. For lack of available space elsewhere the feed works of the tool head is preferably placed high in the head and connected with the ultimately driven part by a single shaft. The present disclosure illustrates a tool head constructed in that manner and in which the feed shaft g depends from the elevated change speed feed gearing and drives the rack pinion shaft 59 located near the bottom of the head.

Accordingly, to eliminate the need for an operator to climb upon makeshift pedestals in order to effect changes in the positions of elements of the feed train located high in the head, it is proposed to arrange the controls for the feed mechanisms at a point distant from the elements controlled and in a position where the operator may reach them. And by way of further refinement, to simplify the control means so that but two distantly located levers need be employed to obtain any one of 18 different feeds for each spindle speed.

In achieving those objects it is proposed to journal an axially movable lever shaft 91 in the upper portion of the main housing adjacent the feed gear mechanisms E, F and G. The inner end of the lever shaft carries a spool 91ª adapted to engage a roller on a feed gear shifter 92. One arm of the shifter 92 is provided with a shifting fork 93 designed to engage the gear 40 of the sliding unit 37. Endwise movement of the lever shaft 91 will thereby shift the unit 37 of gear set E to any one of its three effective positions.

The gear unit 48 of set F is shifted to any one of its three positions by means of the shifter fork 94, lever 95, and the sleeve member 96 which surrounds the shaft 91. By selectively positioning the two gear units 37 and 48, any one of nine different feed changes may be effected, and to avoid the confusion incident to too many levers all of these changes may be placed under the control of a single distant lever.

To that end, the outer end of the lever shaft 91 carries a bracket 97 in which is provided a transverse slot for the reception of a roller carried by the lever 98. The lever 98 has a splined connection with a transverse vertical shaft 99, which in turn is adapted to be oscillated by a "front" gear feed control lever 100. The connection between the control lever 100 and the vertical shaft 99 is similar to that explained in connection with the speed control lever 75, and, therefore, will not be described in detail. Movement of the lever 100 in a horizontal plane, it will be seen, reciprocates the shifter shaft 91, which, through the lever 92, effects repositioning of the sliding gear unit 37 of the transmission E.

Movement of the element 48 of the gear set F is brought about by the axial movement of the control shaft 99 as follows: The outer end of the sleeve member 96 has secured thereto a laterally extending lever 101, the outer end of which carries a roller adapted to track a groove in a spool 102 secured to the control shaft 99. Thus, movement of the lever 100 in a vertical plane, in any one of its three horizontal positions, rocks the sleeve 96, shifter lever 95, fork 94 and effects repositioning of the unit 48 of the change speed set F.

Thus it will be seen that a single lever distantly located may be used to control two change speed mechanisms, having three speed changes each, and in such manner the speeds produced by one set may readily be changed without effecting the positioning of the gears of the other set.

The nine feed changes just mentioned are again multiplied by two by the back gear set G, making 18 feeds in all. These back gears are in turn also controlled from the operator's normal station by the back gear lever 103. Referring to Figs. 2, 4 and 8 a short lever shaft 104 projects from the housing adjacent the shiftable element 56 of the back gears and is provided at its outer end with a lever 105, and at its inner end with a shifter lever 106 that carries a shifting fork 107. The fork 107 engages a groove in the clutch gear element by which it is shifted to either of its effective positions. Suitable detent means are provided for holding the respective shifter levers in their respective positions as will be understood.

The rocking of the lever 105, by the control lever 103, is brought about, in the present construction, by means of a depending tubular shaft 108, the opposite ends of which are engaged by the free ends of the respective levers 105 and 75

103. And in this way the back gears of the feed train are controlled from the operator's position at the spindle nose.

Toward further simplification, the front gear control shaft 99 preferably extends within the tube 108, sufficient clearances being provided so that movement of one of the telescoped members does not inadvertently move the other. To facilitate the proper setting of the front gears of the feed train the control shaft 99 is provided with a pointer 109 that projects through an opening in the tube 108 and traverses the face of a nine division indicia plate 110 fixed to the head frame. If desired, suitable indicia means may be associated with the feed back gear lever 103 also.

From the foregoing it will be perceived that an operator of a machine of this character has available and within quick reach, all of the necessary controls for effecting any one of 36 different spindle speeds and 18 different feeds. The indicia plates are likewise close by and within his normal range of vision. The operator is no longer required to take the risks of injury to himself or the workpiece while effecting changes in feed or speed by means out of his normal reach and working position. The present invention eliminates the hazards of such operations and results in more safely operated and controlled machine tools.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:

1. Control means for serially arranged spindle speed change gear mechanisms in the tool head of a radial drilling machine combining a horizontally disposed shaft journaled in the upper portion of the tool head, said shaft being adapted to be moved axially and angularly selectively; gear shifter levers operatively connected with said shaft, one of said levers being adapted for actuation when the shaft is shifted axially selectively to effect any one of three changes in spindle speed, and one of said levers being adapted for actuation when said shaft is actuated angularly selectively to effect any one of three additional changes in spindle speed; means for actuating said shaft from the lower portion of said drill head comprising a second axially and angularly movable shaft arranged transversely to said first mentioned shaft; operative connections between said shafts so constructed that axial movement of the second shaft effects angular movement of the first shaft, and angular movement of the second shaft effects axial movement of the first shaft; and a single lever mounted adjacent the lower portion of said drill head and at a point distant from said change gear mechanisms for actuating said second shaft selectively in either of said directions of movement thereby to effect through said first shaft and said gear shifter levers any one of nine different changes in spindle speed.

2. In a radial drilling machine having spindle speed change mechanism mounted in the upper portions of the tool head, the combination of means for actuating the movable elements of the said speed change mechanism from the lower portion of the tool head comprising a first shaft axially and rotatably journaled in the upper portion of said head adjacent said speed change mechanisms, connections between said shaft and the movable elements of said speed change mechanism whereby changes in spindle speed may be effected, a second axially and rotatably movable shaft journaled in said tool head extending transversely to said first shaft and to the lower portion of said tool head; two laterally extending lever arms each having a splined connection with one of the transverse shafts and a pin and slot connection with the opposite shaft so arranged that axial movement of one shaft effects rotary movement of the other, and conversely, and manually operable means located at the lower portion of said second shaft for actuating the latter selectively to effect a predetermined movement of the first mentioned shaft and thereby a preselected positioning of the movable elements of the speed change mechanism located in the upper portion of said head.

3. In a radial drill combining a vertically arranged tool head; a rotatable and translatable tool spindle journaled in said head; means located in the upper portion of said head for rotating and simultaneously translating said spindle at various rates; rate change mechanisms located in the upper portion of said head adjacent said rotating and translating means; manually operable control means located at the lower portion of said head for actuating said rate change mechanism thereby to effect changes in the rate action of said spindle rotating and translating means; and operative connections between the control means located at the lower portion of the head and the rotating and translating means located in the upper portion of the said head, comprising a single translatory and oscillatory shaft member for the rate change mechanism of the spindle rotating means and a translatory and oscillatory shaft member for the rate change mechanism of the spindle translating means, motion transmitting connections between each of said shaft members and said control means, and reversely acting motion transmitting connections between each of said shaft members and its associated rate change mechanisms.

4. In a radial drill combining a vertically arranged tool head; a rotatable tool spindle journaled in said head; variable speed means located in the upper portion of said head for rotating said spindle at any one of nine different rates; a single manually operable control lever located at the lower portion of said head for controlling the rate of action of said variable speed rotating means; and operative connections between the said control lever located at the lower portion of the head and the said rotating means located in the upper portion of the head, comprising a translatory and oscillatory shaft member, motion transmitting connections between said shaft member and said control lever including a second translatory and oscillatory shaft member and reversely acting motion transmitting connections between said two shaft members whereby oscillation of one of said shafts imparts an axial movement to the other and conversely.

5. In a radial drill combining a vertically arranged tool head; a tool spindle journaled therein; a power transmission including speed change mechanism located in the upper portion of said head for rotating said spindle at any one of nine different rates of speed; manually operable lever located at the lower portion of said head for controlling the rate of action of said speed change mechanism thereby to control the rate of spindle rotation; and operative connections between said manually operable lever and said rate change mechanism, comprising a rotatable and axially movable shaft member, a rotatable bracket member splined to said shaft, means pivotally mounting said control lever to said bracket on an axis transverse to the axis of the said shaft and a toothed connection between said lever and said shaft, said lever thereby effecting movement of the said shaft axially when the lever is moved in one plane, and rotation of said shaft when the lever is moved in a transverse plane, and correspondingly acting motion transmitting connections between said shaft and the speed change mechanism in the upper portion of the head.

6. In a radial drill combining a vertically arranged head; a rotatable and translatable tool spindle journaled therein; a variable speed power transmission located in the upper portion of said head for rotating said spindle at any one of a plurality of different speeds; a second variable speed power transmission also located in the upper portion of said head for simultaneously translating said spindle at various predetermined rates directly proportionate to the rate of rotation thereof; two independently and manually operable control levers located at the lower portion of said head for changing the ratio of spindle translation to spindle rotation at the selection of the operator, each of said levers being mounted for movement in transverse planes; and motion transmitting connections between each of said levers and one of said variable speed power transmissions, comprising a vertically arranged translatable and oscillatable shaft member, operative connections between said lever and the said shaft whereby movement of the lever in one plane effects reciprocation of the shaft and movement of the lever in a transverse plane effects oscillation of the shaft; and motion transmitting connections between each of said shafts and one of said power transmission whereby the operator may by actuating said levers at the lower portion of the head selectively determine the rate of rotation of said spindle and the rate of translation of the spindle relative to the rate of rotation selected for the drilling operation.

7. In a radial drill combining a vertically arranged head member; a tool spindle journaled therein; a power transmission located in the upper portions of said head for rotating and simultaneously translating said spindle, said transmission including a plurality of sets of serially arranged change speed gear mechanisms; change speed gear shifting devices for said mechanisms located in the upper portions of said drill head; manually operable control means exteriorly located at the lower portions of said head; and operative connections between said control means at the lower portion of the head and the gear shifting devices in the upper portions of said head, comprising a first reciprocable and oscillatable shaft, a second reciprocable and oscillatable shaft arranged transversely to said first shaft, operative connections between said manual means and one of said shafts adapted to oscillate or to reciprocate said shaft selectively; motion transmitting connections between said shafts for changing the oscillatory motion of one shaft to reciprocatory motion in the other, and for changing the reciprocatory motion of one shaft to oscillatory motion in the other, and means for transmitting the motions imparted to the said other shaft to said gear shifting devices in the upper portion of the head, whereby the operator may selectively control the rate of rotation of the spindle and the relation thereto of the rate of translation of said spindle from the lower portion of said head.

8. In a radial drill combining a tool head; a drill spindle journaled therein; variable speed power transmissions located in the upper portions of the head for simultaneously rotating and translating said spindle at any one of nine different rates of rotation and translation; independently operable manual means located at the lower portion of said head for varying the rate of rotation of said spindle and for varying the ratio between spindle translation and spindle rotation; and connections between said manually operable means and said variable speed power transmissions for controlling the rates of action of same, comprising a first set of movable shaft members connected with said manual means, a second set of movable shaft members connected with said variable speed power transmissions and arranged on axes transverse to the axes of the shafts of the first set, power transmitting connections between the shafts of the second set and the shafts of the first set arranged as to convert translatory movements of one shaft to oscillatory movement in the other and conversely, whereby the operator by actuating one of said manual means may selectively effect nine changes in rate of spindle rotation and by actuating another of said manual means may selectively effect nine changes in spindle translation to thereby effect simultaneous translation of the spindle at a rate commensurate with the change effected in rotation of the spindle or with regard to the character of the tooling operation.

9. In a radial drill combining a vertically arranged tool head; a tool spindle journaled therein; a variable speed power transmission including a plurality of speed change gear units, located in the upper portion of said head for propelling said spindle at any one of a plurality of available rates; a manually operable lever located at the lower portion of said head for actuating said speed change gear units to preselected positions; and operative connections between said manually operable lever and said gear units, comprising a first rotatable and axially movable shaft member, a second rotatable and axially movable shaft member, a lever member splined to each of said shafts and adapted to engage a groove provided in the other shaft; means mounting said manually operable lever for movement in transverse planes, and connections between said manually operable lever and said second shaft thereby to effect movement of the said shaft axially when the lever is moved in one plane, and rotation of the said shaft when the lever is moved in a transverse plane, and simultaneously the reverse of said movements in said first mentioned shaft; and operative connections between said first shaft and the speed change gear units of said power transmission operative to reposition certain of said gear units when the shaft is translated and others of said gear units when the shaft is oscillated.

LAWRENCE LEE SCHAUER.